US 6,487,012 B1

(12) United States Patent
Khoshnevis et al.

(10) Patent No.: US 6,487,012 B1
(45) Date of Patent: Nov. 26, 2002

(54) OPTICALLY MULTIPLEXED HAND-HELD DIGITAL BINOCULAR SYSTEM

(75) Inventors: Behrokh Khoshnevis, Marina Del Rey, CA (US); M. Gregory Steinthal, Los Angeles, CA (US)

(73) Assignee: Stereovision Imaging, Inc., Los Angeles, CA (US)

( * ) Notice: Subject to any disclaimer, the term of this patent is extended or adjusted under 35 U.S.C. 154(b) by 0 days.

(21) Appl. No.: 09/616,352

(22) Filed: Jul. 14, 2000

(51) Int. Cl.[7] ............................................. G02B 23/00
(52) U.S. Cl. ........................ 359/407; 359/363; 359/400
(58) Field of Search ................. 359/363, 400, 359/407, 410, 412, 462, 464, 629, 630; 348/42, 49, 53, 56

(56) References Cited

U.S. PATENT DOCUMENTS

| 5,581,399 A | * | 12/1996 | Abe ............................ 359/410 |
| 5,963,369 A | * | 10/1999 | Steinthal et al. ............. 359/410 |
| 6,088,053 A | * | 7/2000 | Hammack et al. ............. 348/61 |
| 6,239,908 B1 | * | 5/2001 | Kelly .......................... 359/480 |

* cited by examiner

Primary Examiner—Cassandra Spyrou
Assistant Examiner—Mark A. Robinson
(74) Attorney, Agent, or Firm—Pennie & Edmonds LLP (57) ABSTRACT

A simplified hand held stereoscopic imaging system in which stereoscopic recording and three-dimensional playback of objects viewed with the device is provided with a single recording element and a single playback element.

29 Claims, 6 Drawing Sheets

OPTICALLY MULTIPLEXED HAND-HELD DIGITAL BINOCULAR SYSTEM

FIELD OF THE INVENTION

The general field of the present invention is hand-held stereoscopic imaging systems. Specifically, however, the invention relates to a solid state stereoscopic imaging system housed within a traditional hand-held pair of prism binoculars, which system is capable three-dimensional recording and play-back of images utilizing only one imaging sensor and one display, rather than two of each as in the prior art systems.

BACKGROUND OF THE INVENTION

The use of prisms to produce enlarged images of distant objects dates back centuries, beginning, according to the history books, when Galileo first held up two prisms and gazed through them. Soon, the appropriated juxtaposed prisms were incorporated into elongated telescopes through which the viewer peered using one eye. The image presented was, of course, flat, consisting of only two dimensions. Much later, it was realized that by holding a telescope to each eye, a stereoscopic image was perceived. However, holding up two telescopes at the same time was not particularly easy, and was definitely not very convenient, thus the same technology was incorporated into what was to become the now well-known pair of hand-held binoculars.

The conventional pair of binocular is basically two small refracting telescopes held together by a frame that positions the telescopes, one to each of the viewer's eyes. Because the binocular incorporates a separate telescope for each eye, it therefore produces a stereoscopic or three-dimensional view that adds "depth" the image as perceived in the viewer's brain.

Each refracting telescope in the binocular has an optical path defined through an objective lens at the end nearest the object being viewed, a pair of prisms appropriately arranged within the telescope's tubular body, and an eye piece that is at the end nearest the viewer's eye. The diameter of the objective lens determines the light-gathering power. The objective lenses (in the two adjacent telescopes) are often spaced farther apart than the eyepieces so as to enhance stereoscopic vision. Functioning as a magnifier, the eyepiece forms a large virtual image that becomes the object for the eye itself and thus forms the final image on the retina. Because of the spacing between the objective lenses, the object is "viewed" from a slightly different angle by each lens and therefore collects a slightly different image. Thus, the image projected onto the retina of each eye is also slightly different, and when the viewer's brain incorporates and melds the two slightly different images received through both eyes, a unified but 3-D or stereoscopic image is perceived by the viewer.

Binoculars are now in ubiquitous usage throughout the world in many, many human endeavors from bird watching to opera-going to star-gazing. Over the years since the binocular was first introduced, many improvements have been made. Until recently, however, these improvements related mainly to refinements in the quality of the binocular's basic component parts, such as improving the optical components to produce clearer images, increasing magnification, adding image stabilization, making them adjustable, making them more durable, making them smaller, making them more ergonomically balanced, adding low light capability, etc.

Recently, however, binoculars entered the digital age. U.S. Pat. No. 5,581,399 disclosed an improvement to the traditional binoculars by incorporating an image sensor, a first optical system (comprising the traditional lens-prisms-eyepiece arrangement), a second optical system (which digitized the signal and included some limited memory) and a display so that the viewer could choose either to view enlarged images through the first optical system in the traditional way, or to view electronically reproduced images that were previously stored in memory within the second optical system and then replayed on the display. Of particular relevance to the present invention, the device disclosed in the '399 patent used two cameras, one in each respective optical channel, to capture separately the images received in each channel, and two internal displays, one for each channel, to produce stereoscopic playback of the stored images so that the stored information is perceived during playback by the viewer in three dimensions rather than two.

More recently still, U.S. Pat. No. 5,963,369 discloses another solid-state stereoscopic imaging system incorporated within a pair of hand-held binoculars. The device disclosed a first optical system, a second optical system, and a third optical system. The first optical system allows for magnified stereo viewing of an external object in the traditional sense. The second optical system allows for recording the magnified stereo image(s) viewed through the optics of the first optical system. The third optical system allows for reproduction of the magnified stereo image(s) captured by the second optical system. The hand-held 3-D imaging system disclosed in this patent further includes record and playback modes that are activated by switches connected to electronic processing circuitry located within the frame of the binoculars. Lastly, this patent further teaches the notion of simultaneously viewing pre-stored 3-D images while concurrently viewing the outside world. Like the '399 patent, the '369 patent also requires that separate systems be incorporated into each of the two telescopes in order for the captured images to be replayed stereoscopically so that viewer perceives the replayed images in three dimensions rather than two.

While these prior art devices which utilized two image capture and replay systems work well, it is well known in the art that the two systems must be perfectly aligned. Otherwise, even if there is only slight deviation between the two images being replayed, side effects such as eye strain and headaches may result.

Accordingly, there is a need in the art for a simplified system that offers all of the features and functionality of these prior art systems, but which eliminates the need for precise synchronization of the two replayed images thus reducing the threat of eye strain, headache and other detrimental results, and as an additional benefit, also reduces the cost and complexity of the system.

SUMMARY OF THE INVENTION

The present invention overcomes the problems associated with the prior art in a hand-held 3-D imaging system of the type previously described in which a pair of hand-held, twin-telescope prism binoculars are fitted with an integrated stereoscopic imaging system that can record and stereoscopically playback one or more images seen through the optics of the binoculars, and in which the stereoscopic record and playback functions are accomplished, through the use of only one imaging sensor and one display, rather than having an imaging sensor and emitter placed in the optical path of each of the two telescopes. This is accomplished by the use of optical switches that are alternated between the "on" (transparent) and "off" (opaque) positions at a rate of 30 Hz or higher.

In still another, separate aspect of the present invention, 3-D viewing on a PC monitor or television can be achieved by use of an external stereoscopic eyewear to process left/right video signals, thus delivering a full-color, flicker-free 3-D image to the viewer or audience.

In yet another, separate aspect of the present invention, information can be uploaded into the viewing device. This can be useful for scene interpretation and/or image recognition.

Still another, separate aspect of the present invention, is the addition of stereo sound to any image or sequence of images stored by incorporating internally-mounted microphones within the body of the binoculars.

The device of this invention can be used for outdoor 3-D viewing, recording viewed objects in 3-D, and internal or external playback of objects recorded in 3-D. In addition, pre-stored or remote real-time images can be overlaid while stereoscopically viewing the outside world as well as stereoscopically recorded and played back. Wireless capabilities with Internet connectivity can also be added to the device of this invention.

Accordingly, it is the primary object of the present invention to provide a simplified prism binoculars with an integrated solid-state stereoscopic imaging system with only one optical receiver and transmitter common to both binocular channels. This and further objects and advantages will be apparent to those skilled in the art in connection with the drawings and the detailed description of the preferred embodiment set forth below.

BRIEF DESCRIPTION OF THE DRAWINGS

FIG. 2B shows that the beam of light carrying the image enters through each of the binocular telescopes, which beam is then split by the in-line beamsplitter, one of the split beams then going through the traditional prisms and eyepiece of the telescope to be magnified and viewed in real time by the user of the device, and the other split beam being directed to the shutters (which alternate at high frequency between the "on" state (transparent) and the "off" state (opaque), to the beam combiner and then to the photosensitive receiver. FIG. 2A shows how the replayed image is replayed back through the beam combiner, through the shutter, and ultimately to the eyepieces in the binoculars.

DETAILED DESCRIPTION OF THE PREFERRED EMBODIMENTS

A stereoscopic effect is the creation of the illusion of three dimensions (that is, the appearance of depth or solidity) in a two-dimensional image. This effect can be created by superimposing two different views of the same scene to form a composite image, the composite being at the point where the two lines of sight cross one another. If the two views are laterally displaced from one another by an amount approximately equal to the distance between the viewer's eyes, the resulting image will have essentially the same three-dimensional appearance as if the viewer were seeing the scene with the naked eye. Where the separation is greater than that between the viewer's eyes, the three-dimensional effect is exaggerated. Similarly, if the distance is less, the three-dimensional effect is minimized. As mentioned in the Background section above, this effect is achieved naturally by humans and most animals because their eyes are spaced a distance apart. The image seen by each eye is at a slightly different angle or perspective relative to the object being viewed. When these two images are "superimposed" within the brain, the image perceived is three-dimensional. To maintain this stereoscopic imagery during magnification, the conventional binoculars were developed.

For this reason, today's existing hand-held binoculars are a perfect platform upon which to integrate a solid-state stereoscopic imaging system. The binocular optics needed to create the 3-D effect are already in place, the distance between the eye pieces has been optimized, and binoculars in general have passed the test of time for improved image enhancement, ergonomics, comfort and reliability. Therefore, the basic components of the conventional binoculars form the framework within which the inventive elements herein described are housed.

Figure 1:
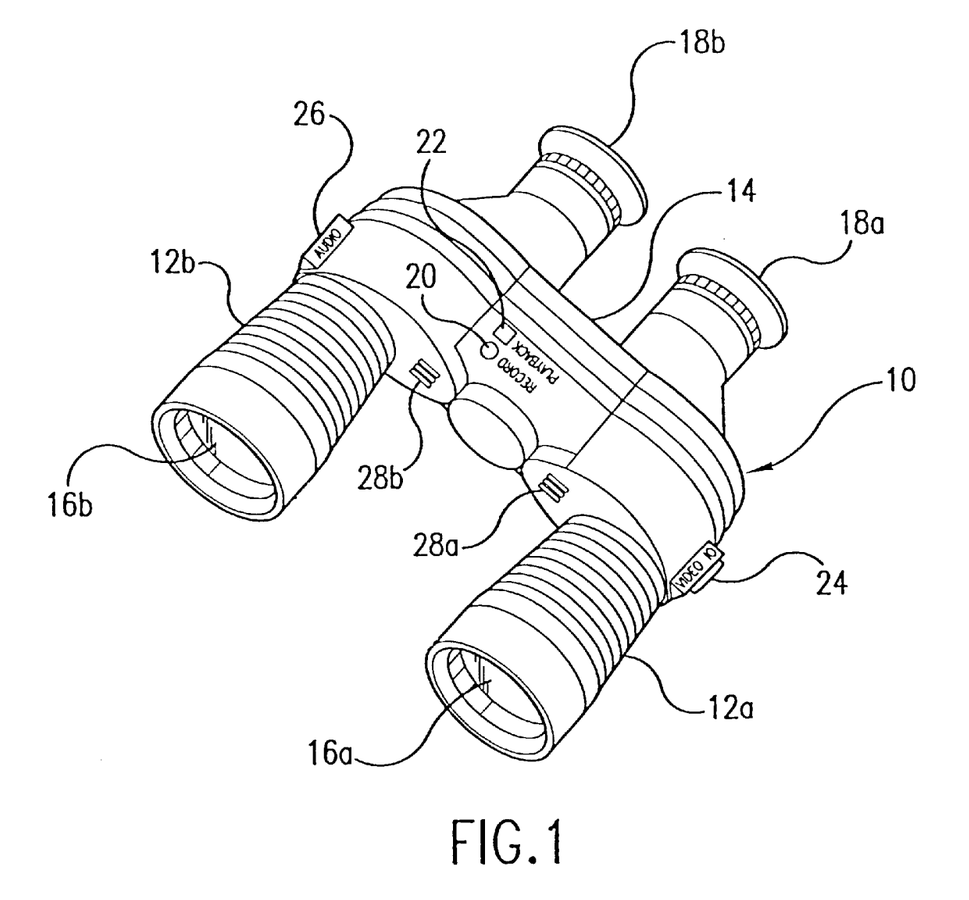
FIG. 1 is a perspective view of the binoculars-type device that houses all of the components of this invention. This view is generally of the top of the device, showing, among other things, the preferred location for the record and playback buttons for activating those function, as well as the preferred locations for the audio out and video input/output connections, and the preferred location for the openings in the body that allow sound to reach the internally mounted stereo microphones.

Referring now to FIG. 1 the complete package of the present invention looks very similar to today's hand-held binoculars 10. A pair of binoculars is basically two small refracting telescopes 12a and 12b held together by a frame 14 that, by definition, holds the telescopes 12a and 12b sufficiently far apart such that once their separate images are superimposed on one another, a stereoscopic or three-dimensional view is produced. As in most binoculars, the frame 14 allow the distance between the telescopes 12a and 12b to be adjusted so as to accommodate the differences in the distance between the eyes of multiple users. As in the traditional binoculars, the externally visible components include the art objective lens 16a and 16b at the distal end of each of the telescopes 12a and 12b, and eyepieces 18a and 18b.

Taking advantage of this proven existing binocular design the preferred embodiment integrates the imaging system within the package so that only a record button 20, playback button 22, the video input/output port 24, the audio output port 26, and the microphone openings 28a and 28b are visible on the top view of the outside housing, and in any way distinguish the device of this invention from the traditional hand-held binoculars.

The record button 20 allows the user to easily activate the "record" function of this preferred embodiment of the invention so that any image seen through the telescopes 12a and 12b of the binoculars 10 can be simultaneously recorded for later viewing, downloading or wireless transmission. The record function in this embodiment also allows simultaneous recording of stereo sound through the microphone openings 28a and 28b. Likewise, the playback button 22 allows the user to instantly (or at a later time) playback the stored images and the sound file as a "video clip" stereoscopically—or in other words the images are played back simultaneously to each eye through the eyepieces 18a and 18b. Also visible on the outside package side view that differs from today's binoculars is a small 3 mm phone jack 24 that provides a digital video input/output to any external device accepting the video format. Likewise, a headphone jack 26 is added to provide an analog audio output. Stereo sound is picked-up by the internally mounted microphones placed behind the small openings 28a and 28b to allow sound waves to freely pass. Also unlike the conventional binoculars, the preferred embodiment of this invention will include a battery compartment and access door (not shown) in the frame 14, to house a battery that is user accessible and needed to power the internal electronics of the system.

Figure 2A:
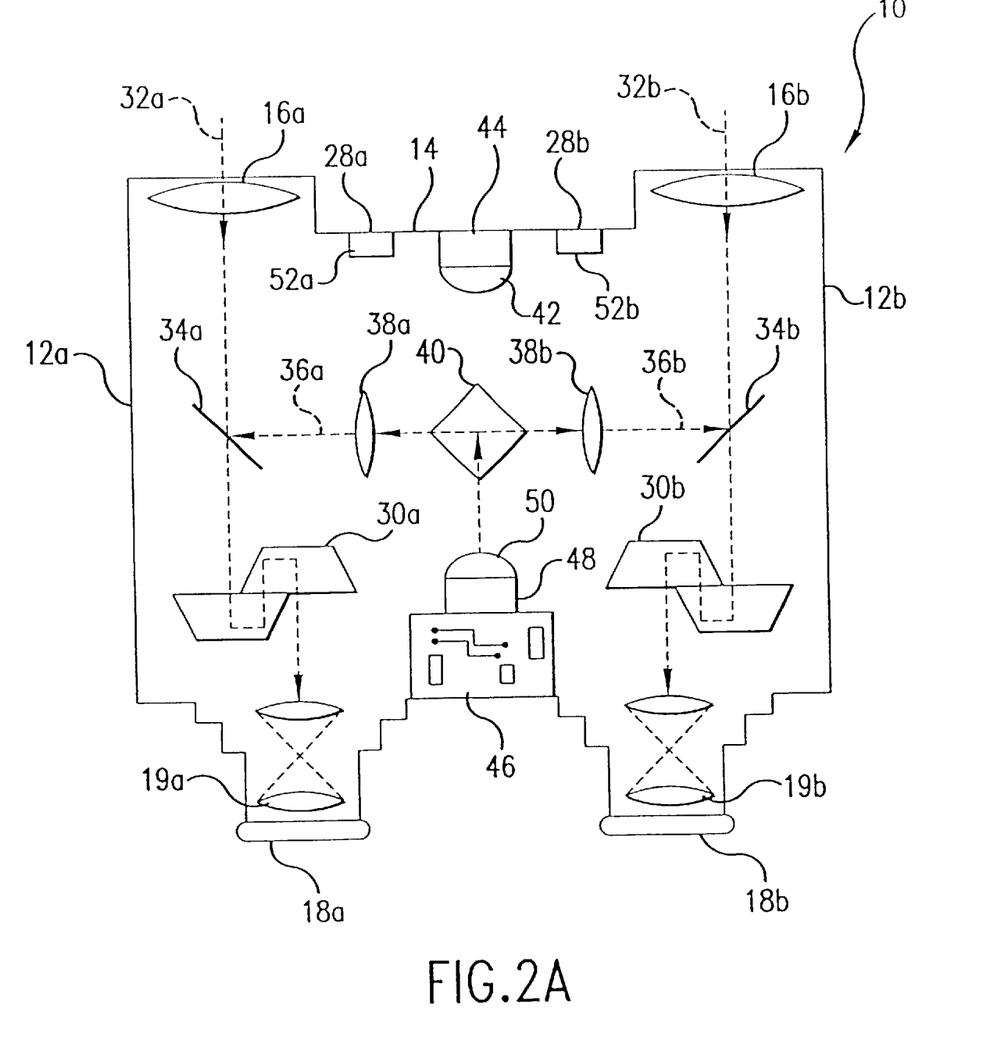
FIG. 2A and FIG. 2B are ray trace diagrams that show how the light rays carrying the image to be viewed is routed through and to the various components of the preferred embodiment of this invention. Specifically.
Figure 2B:
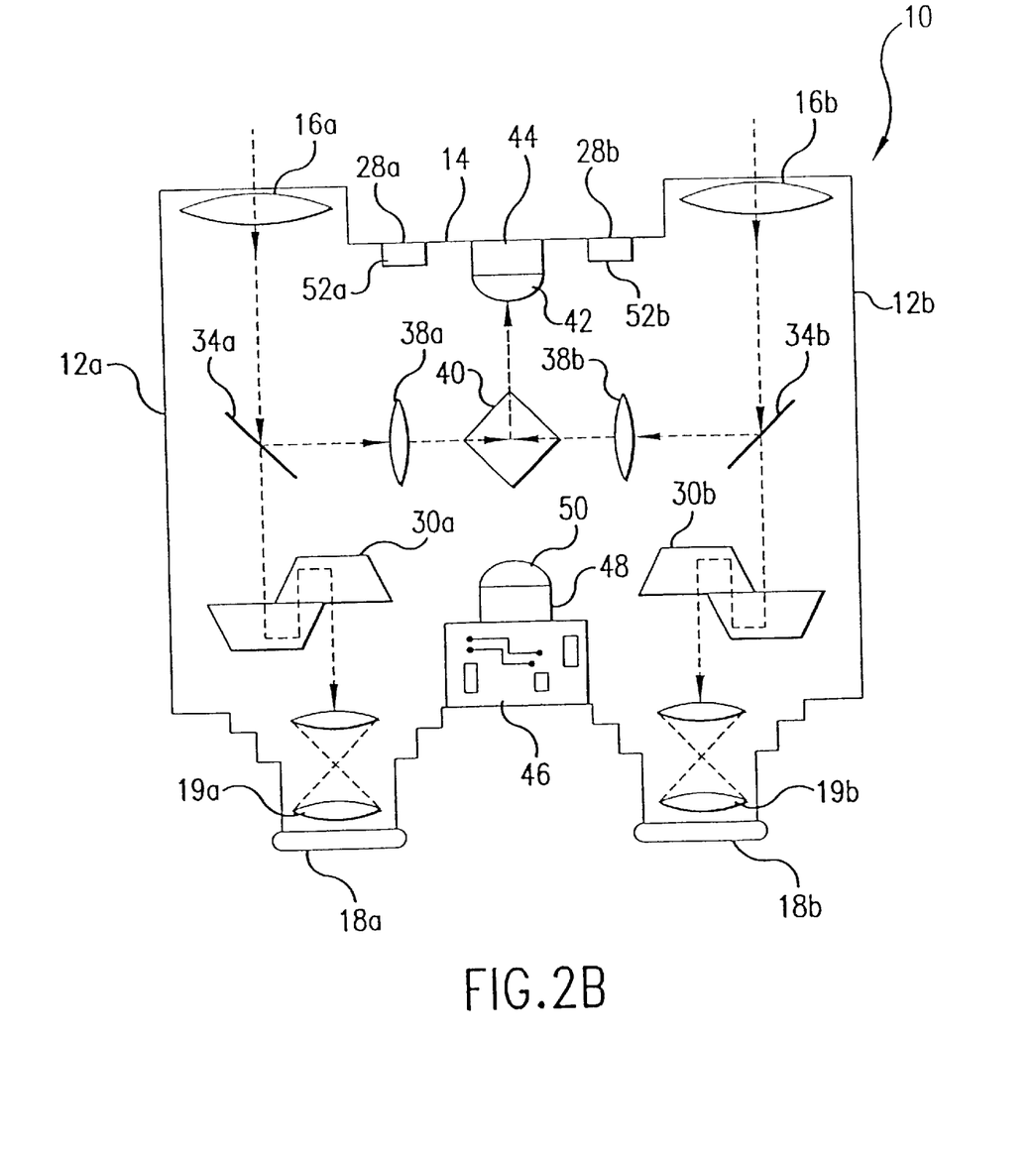

Referring now to FIGS. 2A and 2B, each refracting telescope 12a and 12b has an optical path defined through the objective lens 16, a pair of prisms 30, and the eye piece 18 (which has an eyepiece lens 19). These elements define the primary optical path within each telescope. The diameter of the objective lens 16 determines the light-gathering power. The two objective lenses 16a and 16b are further apart than the human eyes, which enhances stereoscopic vision. Functioning as a magnifier, the eyepiece lens 19 forms a large virtual image that becomes the object for the eye itself and thus forms the final image on the retina. Similar to existing binocular design, after the light rays 32 enter through the objective lens 16 it is bent by the pair of prisms 30 before passing through one or more additional optical components. The prisms 30 turn the image-inverted by the objective lens 16 right side up again and allows the distance between the objective lenses 16 to be twice as far apart as that between the eyepiece lenses 19, thus further enhancing the viewer's depth perception. The prisms 30 also lengthen the path that the light ray or beam 32 travels between the lenses 16 and 19, which narrows the field of view and increases magnification in a short tube. The eyepieces 18 are the typical eyepieces used in existing binocular design in which the basic structure consists of two lenses 19 of the same glass separated by a distance equal to half the sum of their focal lengths. This provides magnification as well as correction for lateral chromatic aberrations.

The light beam 32 is then split by the beam splitter 34 placed in the optical path between the lenses 16 and 19 to split a portion 36 of light 32 onto a secondary optical path and directs it through a liquid crystal 38 utilized as an electro-optical shutter. The shutter, upon demand, can be opaque in one state and transparent in another by supplying a small current under processor control and altering the liquid crystal's polarization properties. The shutters 38a and 38b alternate at more than 60 times per second in synch, such that one is transparent while the other is opaque. This in effect blocks the light rays in one channel while the image from the other channel passes through. After the light rays pass through the shutters they are reflected by the beam combiner 40 and focused by the receiver focusing optics 42 onto a single photosensitive receiver 44, which converts one or more images into an electronic record signal. In the preferred embodiment, the photosensitive material 44 is a solid state device such as a charge-coupled device (CCD) or CMOS photoarray, although any other solid-state imaging sensor could also be used. The photoarray 44 is electronically controlled to capture any image at any point in time activated by the record button 20. The internal electronic processing circuitry 46 is shown to rest between the two refracting telescopes on a printed circuit board located within frame 14.

By having the shutters 38a and 38b alternate at a rate faster than the human eye and brain can detect, the system is also optically and alternatingly selecting the light received through the two respective telescopes 12 for video capture at a rate faster than the eye can detect. Thus, the two similar-but-from-a-slightly-different-perspective views of a object being viewed through the binoculars 10 are captured and recorded in an alternating fashion—left eye image, right eye image, left eye image, right eye image—at a constant rate that is faster than the human eye and brain can detect (for example, although the picture that is displayed on a television is perceived by the human eye and brain to be continually displayed, it is actually flashing on and off at 60 cycles per second).

It is known that due to the angle of vision of each eye being slightly different, the human brain receives the two different images and combines the two different angular views of the similar scene to create a depth perception sensation. With this invention, however, only one "eye" is required due to the fast speed of acquisition and with the aid of switching between the two separate optical systems the different angular information is recorded on a single "eye." Similarly, playback is accomplished using a single "projector" that projects back the single stream of video information consisting of the alternating "left eye image, right eye image, left eye image, right eye image" at a constant rate that is faster than the human eye and brain can detect. That beam of video information is sent back to the same alternating shutters 38 during the record function, but this time the shutters 38 provide a gatekeeper function, allowing only the left-eye image to pass through to the viewer's left eye, and then allowing only the right-eye image to pass through to the viewer's right eye. Even though the image being conveyed to each is not constant, the cycle frequency is too high for the brain to distinguish, hence the image received in each eye is perceived by the brain to be constant. Thus, once the brain superimposes those two images, it is perceived by the viewer to be three dimensional or stereoscopic, even though both the record and playback function were performed monoscopically. The componentry used in this playback function will now be described in detail.

The LCD 48 is electronically controlled and is activated by the playback button 22. In the playback mode, the real-time images being received though the objective lenses 16 can be blocked, for example by simply placing the conventional lens cap (not shown) over the lenses, or the real-time image can be allowed to be viewed such that images emitted by the LCD 48 overlay with images viewed through the lenses 16 of the device 10. Images emitted by the LCD 48 are imaged through imaging optics 50 reflected off the beam combiner 40, passes through the liquid crystal optical shutter 38, and is again reflected off the beamsplitter 34, forming an image onto the primary axis for viewing.

The optical switches 38a and 38b are electronically synchronized to turn "on" and "off," similar to recording, such that the image previously captured and stored by the left channel can be retrieved and played to the left eye; likewise, the image captured by the right channel is played to the right eye. Thus the human brain receives the two different images emitted from a single display and combines the two different angular views of the similar scene to create a depth perception sensation.

In the preferred embodiment, the solid-state imaging display emitter 48 is a miniature liquid crystal display (LCD). Although the preferred embodiment uses a half-silvered mirror for beamsplitter 34, another device that performs the same function could be substituted for the half-silver mirror.

To summarize, the optical paths of the layouts of FIGS. 2A and 2B consist of an objective lens 16 to gather the light, prisms 30 to increase magnification, a beamsplitter 34 to split the light through a shutter 38, reflected off the beam combiner 40, through imaging optics and ultimately focused onto the imaging sensor 44 which digitizes the video image (s) and is electronically stored the for later viewing. The optical shutters 38a and 38b allow an image to be formed on the image sensor from either the right or left channel, alternating between the two for stereoscopic capture. During playback the same scheme is utilized, here the single LCD 48 and LCD optics emit the image or sequence of images to the same beam combiner 40 where it is reflected through the optical shutter 38 and again reflected onto the primary axis by the beamsplitter 34 for viewing. Again the optical shutters 38a and 38b allow playback of the left channel captured images then the right channel for stereoscopic playback.

The optical layout of FIG. 2 is common to both refracting telescopes 12a and 12b. To achieve stereophonic effect to augment the stereoscopic effect achieved by this invention, conventional microphones 52a and 52b are affixed to the frame 14 of the binoculars, immediately adjacent to each of the microphone openings 28a and 28b so that sound waves from the exterior of the device can be picked up by the microphones 52, which are hardwired to the internal electronic processing circuitry 46. The analog audio output jack 25 is also hard-wired to the internal electronic processing circuitry 46.

Figure 3:
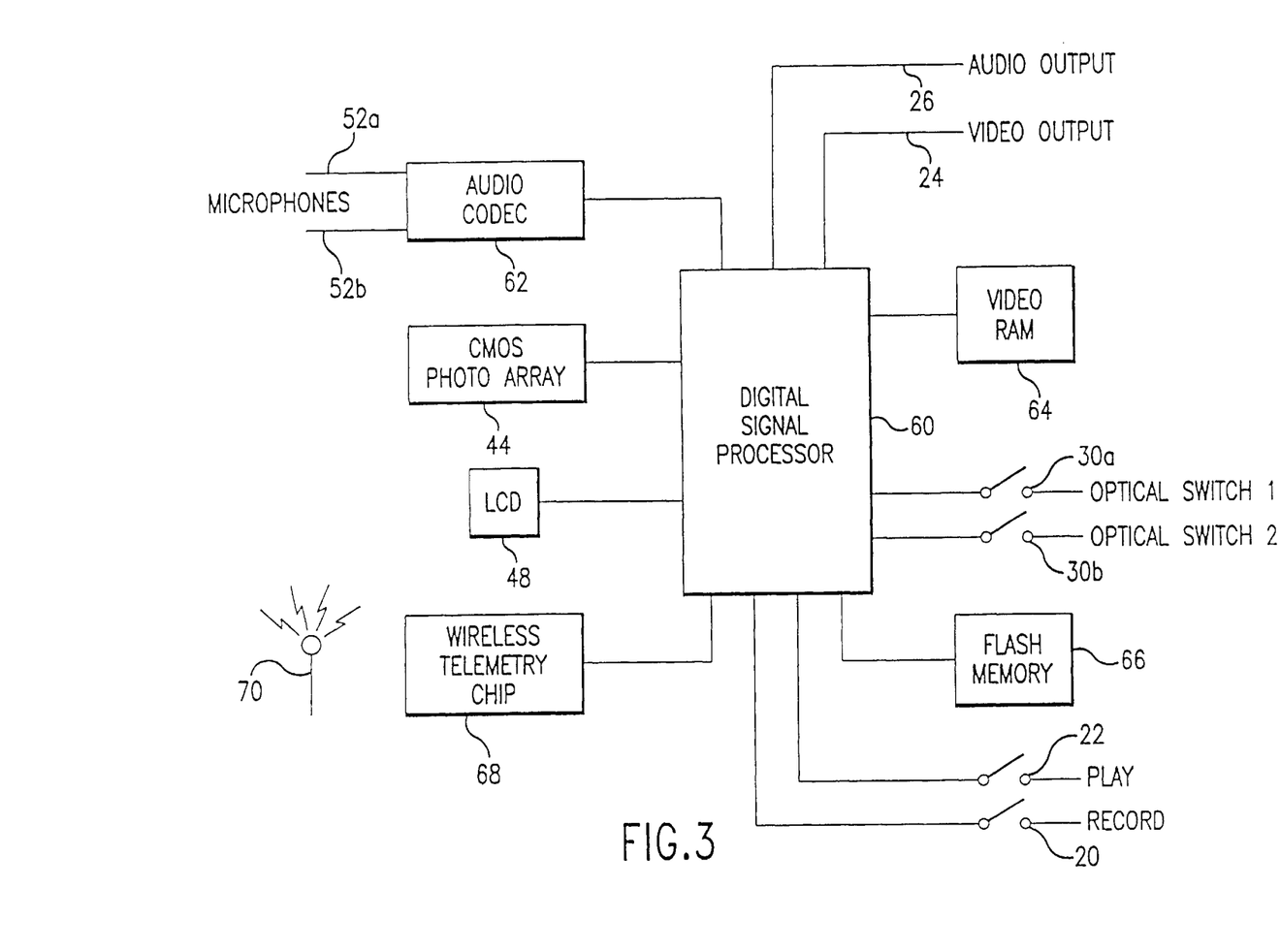
FIG. 3 is a schematized block diagram of the optical layout of the integrated system of the preferred embodiment of the present invention.

FIG. 3 is a schematized block diagram of the electronic circuitry contained in the printed circuit board 46. The embedded Digital Signal Processing chip 60 is responsible for enabling/disabling the CMOS photo sensitive array 44, the LCD 48, the optical switches 38a and 38b and the microphones 52 are triggered by the record and playback buttons 20 and 22, respectively. The audio codec chip 62 digitizes the audio information picked up by the microphones 52. It is then stored by the processor 60 as a sound file associated with the video information that was recorded at the same instant in time. The DSP 60 is also responsible for image compression, color correction and other signal processing tasks. For temporary data calculations video RAM 64 is added. The images are permanently stored in flash replaceable memory 66. Information can also be uploaded from flash memory 66 to the playback function of the device if so desired. The information maybe overlaid so that the information is displayed while viewing the outside world or perhaps one channel views the outside world, while the other channel displays information for image recognition images. For example, while bird watching an exotic bird is seen. It is conceivable the other channel can be uploading information from a library of exotic birds, so that a match can be made and the bird's identity would be known in real time.

The processor 60 also may have to be responsible for image stabilization if the binocular magnification power is high enough to cause any image distortions. A digital video output is provided to the video i/o port 24. An analog output is provided through the digital-to-analog converter to the audio output jack 26. With conventional and appropriate wire connections (not shown), the signal from that output jack can be used to drive an external pair of speakers or headphones so that the user of the device can hear the stored and replayed signal at the same time he or she is watching the replay of the stored video information.

Further a wireless telemetry chip 68 adds the capabilities to receive and transmit information remotely for real time stereoscopic playback via the LCD 48 within the device or information can be captured in stereo via the image sensor 44 and transmitted to a remote processor node tied to the Internet. The wireless telemetry chip 68 modulates the field sequential signal for wireless transmission via attached antenna 70.

Figure 4:
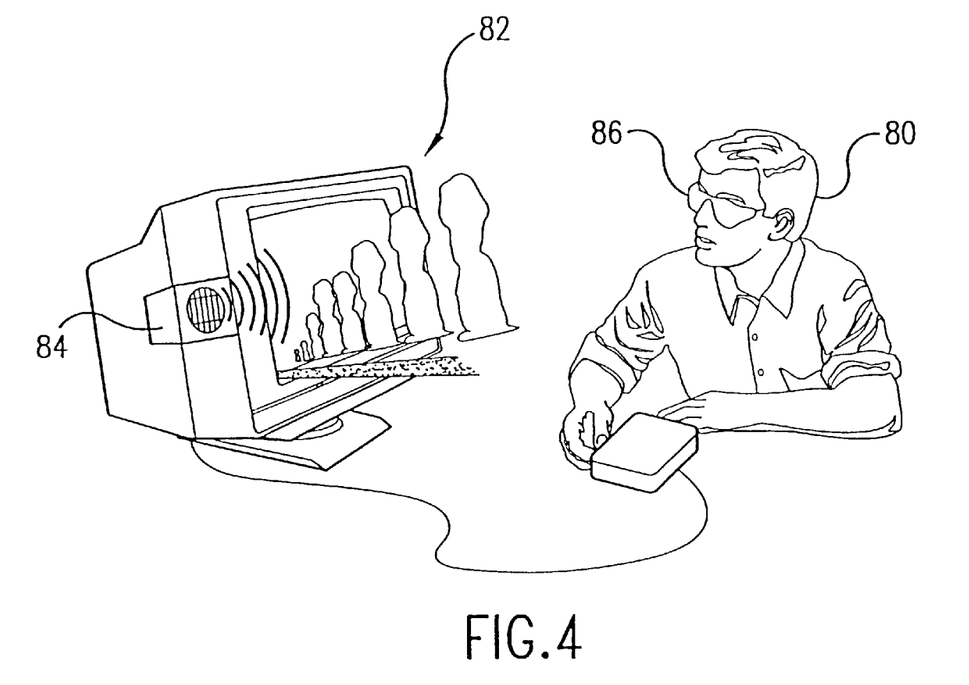
FIG. 4 is a graphic illustration of how the data recorded by the device of the present invention can be downloaded to a PC, then replayed in three dimensions with the use of appropriate and conventional 3-D glasses.

FIG. 4 shows yet another embodiment and use of the device of this invention. The user 80 can take either the disclosed imaging device 10 or the replaceable flash memory card 66 and connect to any PC or monitor (television ) 82 containing the proper hardware to multiplex the right and left eye video information and sound system 84 to view and listen to the video clip in 3-D. The user 80 or a number of viewers must wear special glasses or polarizers 86 to view the video clip. The polarizers 86 separate the left image from the right image. As discussed above, the person's brain will attribute a sense of three dimensionality to the image viewed because of the two similar but not identical images.

Figure 5:
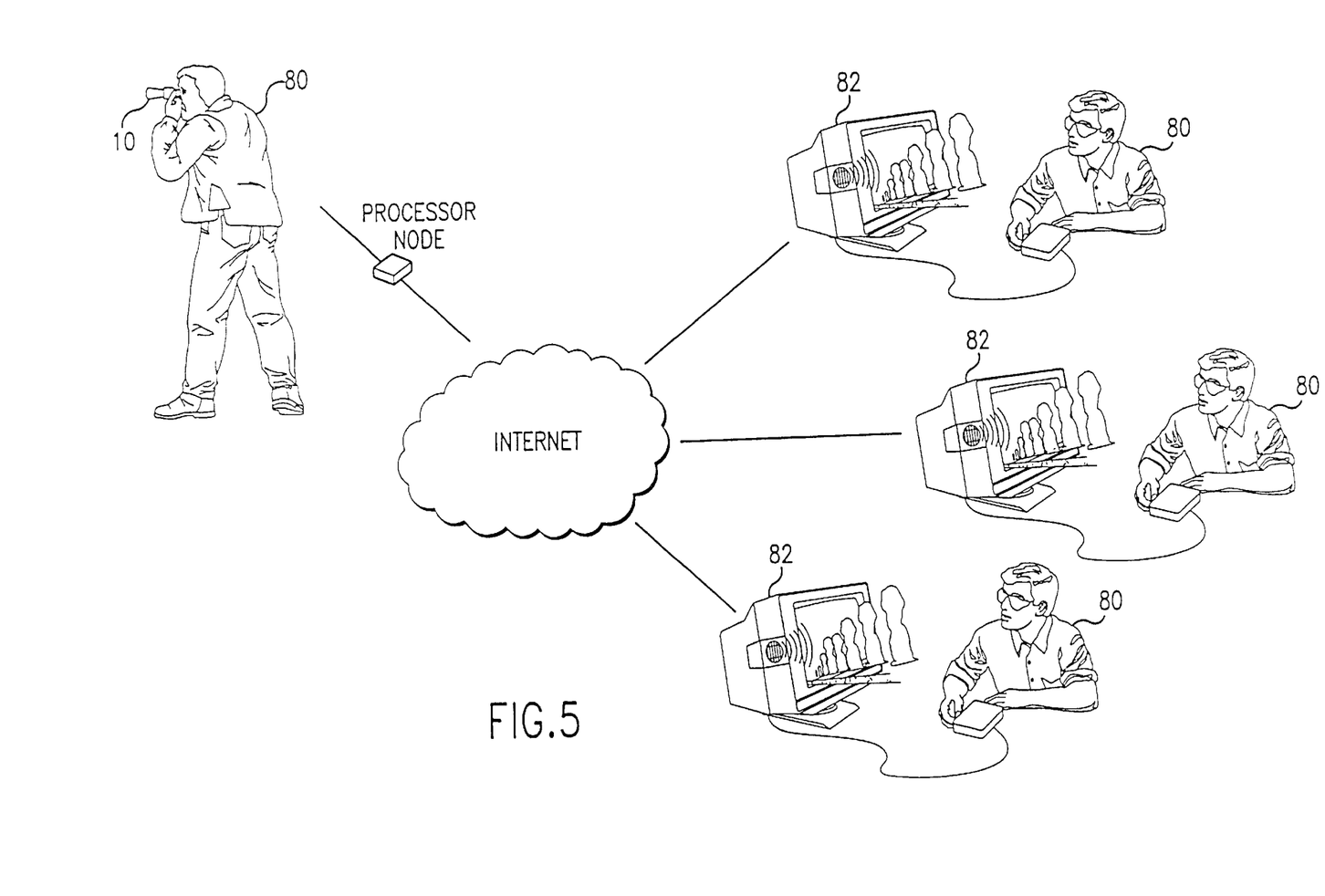
FIG. 5 is a graphic illustration of how the device of the present invention can be used to receive and/or transmit information remotely via the Internet for example.

FIG. 5 shows yet another embodiment and use of the device of this invention. User 80 is shown using integrated hand-held stereoscopic imaging system 10 to look out at the outside world. If so desired, and assuming the user is at a location supporting wireless communication, the user 80 can transmit what is currently being viewed via wireless communication using the systems wireless telemetry chip 68. In addition, the transmission can be sent, for example, to a node processor that has Internet connectivity. Through any home computer, 82, anywhere in the world, a user 80 can connect to the Web and remotely view, in real time, the transmission in 3-D.

Further information can be received from a remote site to the imaging device 10 if so desired. This information may be overlaid in 3-D so that the information is displayed while viewing the outside world or perhaps one channel views the outside world, while the other channel displays information for image recognition images.

It will be readily apparent to those skilled in the art that still further changes and modification in the actual concepts described herein can readily be made without departing from the spirit and scope of the invention as defined by the following claims.

What is claimed is:

1. A hand-held 3-D imaging system, comprising:
   a) a pair of hand-held prism binoculars having at sleast two refracting telescopes mounted on a frame;
   b) each of said refracting telescopes having an objective lens, a pair of prisms and an eyepiece whereby a primary optical path is defined within each telescope wherein a beam of light that enters in through the objective lens travels through the prisms and out of the eyepiece;
   c) at least two beam splitters attached to said binoculars, at least one each within said primary optical path within each telescope, each said beam splitter being positioned such that it diverts a portion of the beam of light in said telescope from said primary optical path onto a secondary optical path;
   d) a least two optical shutting devices attached to said binoculars, one of said devices within said secondary optical path downstream of each said beam splitter, each said shuttering device capable of cycling alternatively between the states of being transparent and of being opaque;

e) means for causing said shuttering devices to alternate between said transparent and opaque states in a coordinated fashion, such that when one device is opaque, the other is transparent;

f) a beam combiner attached to said binoculars within said secondary optical path and positioned downstream of each said optical shuttering device such that the separate beams of light being alternatively transmitted through said shuttering devices are recombined into a continuous beam;

g) a solid-state imaging sensor attached to said binoculars and positioned downstream of said beam combiner for receiving said continuous beam;

h) electronic storage media attached within said binoculars and electronically connected to said solid-state imaging sensor, said electronic storage media capable of electronically storing the images sensed by said sensor;

i) electronic processing circuitry attached within said binoculars and electronically connected to said electronic storage media and said solid-state imaging sensor for processing the electronic record signal in each refracting telescope and storing it as electronic data in the electronic storage media; and j) a power source electronically connected to said processing circuitry, said electronic storage media; said beam combiners, said shutter devices, said beam splitters, and said solid-state imaging sensor.

2. The system of claim 1 further comprising an image display device attached to said binoculars and electronically connected to said electronic storage media and said processing circuitry, said image display device capable of re-creating the beam of images previously stored on said electronic storage media.

3. The system of claim 2 which further provides for stereoscopic replay of the stored images, wherein said beam of replayed images from said image display device are focused onto said beam combiner, which in turn redirects said beam onto each of said alternating optical shutters, which in turn, when in the transparent state, allows said beam to pass through said shutter to the beam splitter, which in turn redirects the beam through said prisms and eyepiece in each said telescope.

4. The system of claim 3 further comprising means for causing said shutters during replay of the images from storage to cycle from the transparent state to the opaque state in a manner that is synchronized with the alternating images on the beam being replayed, such that only the image initially stored from each particular telescope is returned to the primary optical path within that particular telescope for viewing through said eyepiece thereof.

5. The system of claim 3 further comprising a focusing device attached to the binoculars and designed and constructed to focus said beam from said beam combiner onto said sensor.

6. The system of claim 3 further comprising a focusing device attached to the binoculars and designed and constructed to focus said beam from said image display device onto said beam combiner.

7. The system of claim 3 wherein said imaging sensor comprises a CMOS photoarray.

8. The system of claim 3 wherein said image display device comprises a liquid crystal display.

9. The system of claim 1 wherein said shutters comprise a liquid crystal that is alternating between the states of transparency and opaqueness at a rate of speed that is faster than the human eye and brain can detect.

10. The system of claim 1 wherein said electronic processing circuitry is contained on a printed circuit board attached to said frame between said refracting telescopes.

11. The system of claim 1 wherein said electronic processing circuitry includes an embedded micro-controller.

12. The system of claim 1 in which said power source is attached within said frame.

13. The system of claim 1 in which said power source is contained in a separate unit that is electronically connectable to said binoculars.

14. The system of claim 13 in which said power source comprises a battery pack that is selectably connectable to said binoculars.

15. The system of claim 1 further comprising means for image stabilization.

16. The system of claim 1 in which there are two telescopes, one of which provides a first primary optical path and the other of which provides a second primary optical path.

17. The system of claim 1 further comprising means for generating an analog or digital video output, a input/output port physically attached to said binoculars in a way that it is accessible from outside said binoculars, said port electronically connected to said means for generating an analog or digital video output such that images replayed can be transmitted to said port.

18. The system of claim 17 further comprising means for inputting a digital video input signal into the hand-held 3-D imaging system so that it can be viewed as a stereoscopic video signal through the eyepieces of said refracting telescopes.

19. The system of claim 1 further comprising replaceable memory storage devices that are attached to said binoculars and electronically connected to said sensor.

20. The system of claim 1, further comprising a pair of microphones mounted within said binoculars and electronically connected to said processing circuitry;
   means for storing stereo sound signal received from said microphones simultaneously with the images being viewed; and means for playback of stereo sound simultaneous with the replay of the stored images.

21. The system of claim 1 further comprising means for wireless transmission of images viewed through said telescopes.

22. The system of claim 1 further comprising means for wireless receipt of images for replay within the system of this invention.

23. A hand-held 3-D imaging system, comprising a pair of hand-held prism binoculars comprising two refracting telescopes mounted on a single frame, each of said refracting telescopes having a first optical system with magnification for viewing distant objects through the telescope along a first optical light path defined through an objective lens, a pair of prisms and an eyepiece; said system further comprising:

a) an imaging emitter with imaging optics;

b) a beamsplitter placed in the primary optical light path between the objective lens and the eyepiece to split and/or combine a portion of a light beam traveling through the primary optical light path and/or originating from the imaging emitter;

c) an optical shutter between said beamsplitter and said imaging emitter;

d) a beam combiner;

e) an imaging sensor with imaging optics;

f) a record control device for activating the imaging sensor in each of the refracting telescopes to record;

g) a playback control device for activating the imaging emitter to playback in each of the refracting telescopes;

h) electronic storage media;

i) electronic processing circuitry for processing an electronic record signal in each of the refracting telescopes and storing it as electronic data in the electronic storage media and for retrieving electronic data stored in the electronic storage media and for processing it into an electronic playback signal which is sent to the imaging emitter in each of the refracting telescopes to create a stereoscopic image seen through the eyepiece of each of the two refracting telescopes; and j) an internal telemetry device for wireless receiving and transmitting of remote real-time signals to and from the device.

24. The hand-held 3-D imaging system as recited in claim 23, further enabling overlaying remote real-time stereoscopic images while stereoscopically viewing the outside world.

25. The hand-held 3-D imaging system as recited in claim 23, where remote stereoscopic images can be recorded in 3-D within the device.

26. The hand-held 3-D imaging system as recited in claim 23, where remote stereoscopic images overlaid with images seen through the device can be recorded in 3-D within the device.

27. The hand-held 3-D imaging system as recited in claim 23, further enabling 3-D internal or external playback of recorded images.

28. The hand-held 3-D imaging system as recited in claim 23, where 3-D images viewed through the device can be remotely transmitted to a node processor that has Internet connectivity.

29. The hand-held 3-D imaging system as recited in claim 23, where transmitted 3-D images can be remotely viewed in real-time and in 3-D to a user logged on to the Web.

* * * * *